UNITED STATES PATENT OFFICE.

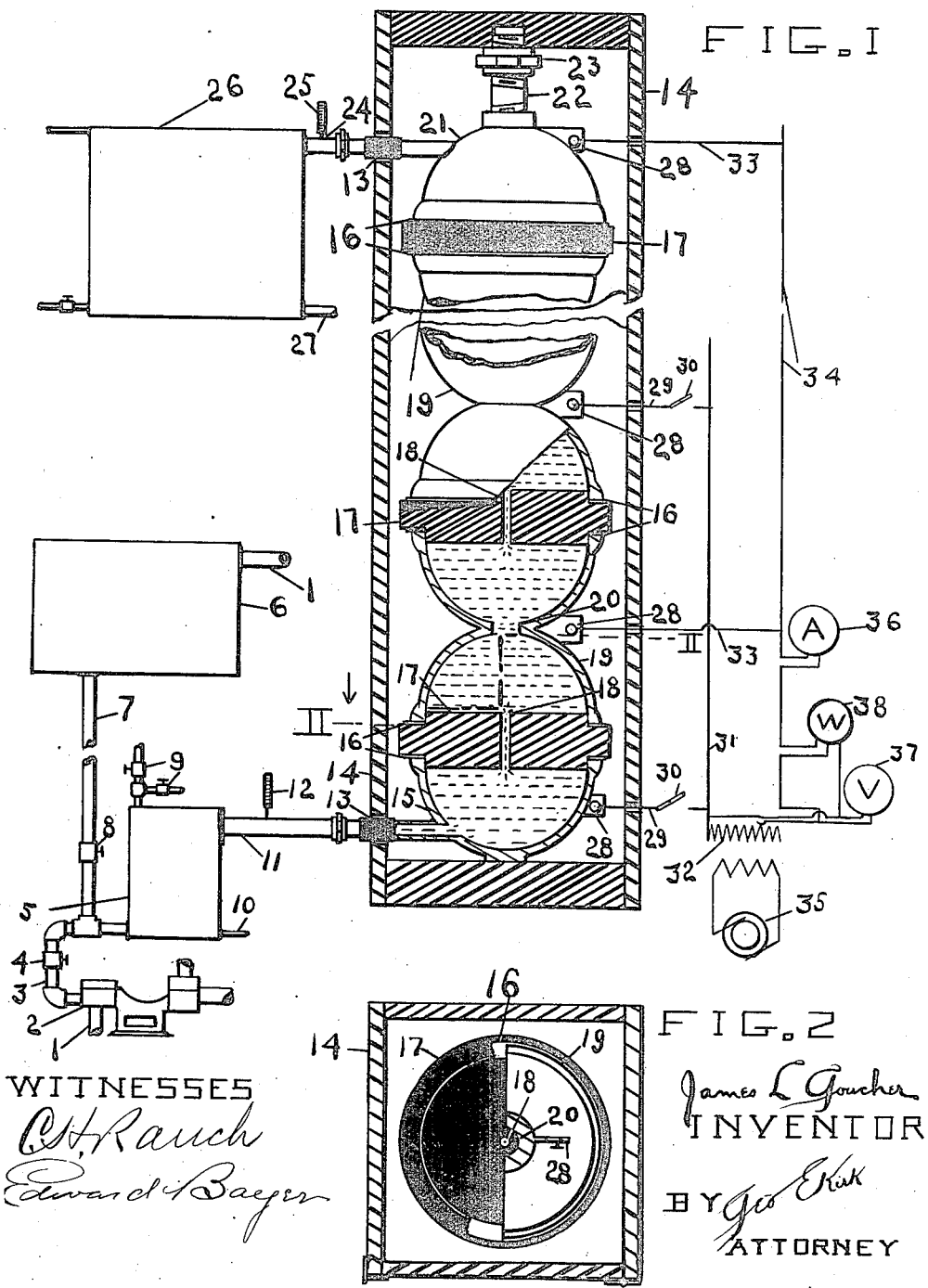

JAMES L. GOUCHER, OF NEW YORK, N. Y., ASSIGNOR, BY MESNE ASSIGNMENTS, TO THE NEW YORK CONVEYANCERS COMPANY, A CORPORATION OF NEW YORK.

MILK PRODUCT.

1,181,219.          Specification of Letters Patent.          Patented May 2, 1916.

Application filed April 1, 1909. Serial No. 487,176.

*To all whom it may concern:*

Be it known that I, JAMES L. GOUCHER, a citizen of the United States, residing at New York, New York county, New York, have invented a new and useful Milk Product, of which the following is a specification.

This invention relates to a milk product and to the manner of treating fluids to render them bacteria free and to improve the digestibility.

This invention has utility as a purified fresh milk product of exceptional value for invalids and children. The fluid treatment herein disclosed is especially valuable for milk to prepare the purified milk product.

The physical and chemical characteristics of milk vary to quite a wide extent from different animals, and as to feed and climate; and likewise the product herein will not only vary to the same extent, but also further due to the modifications of the treatment. In the course of an extended series of comparative tests during quite a considerable time, in each of which instances the treated milk hereof has shown marked superiority over the natural, untreated or raw milk, in being sterile and of improved digestibility, it has developed that to a quite remarkable extent many of the normal or original natural characteristics have remained unchanged, in fact to a much greater extent than in "sterilization" and "pasteurization" processes. Apart from its purity, sterility and improved or of more than normal digestibility, it is practically unaltered natural milk, as to general characteristics for consumption when fresh. The milk is maintained normal as to viscosity, specific gravity, water content, acidity, ash; most nearly approximates normal as to milk sugar and fat. The total proteids approximate normal, and in certain treatments from which tests show a reduction of casein with increase in globulin or albumin, the totals still approximate normal for the proteids, seemingly confirming that some transposition has occurred in the proteid group. In view of these normal or standard conditions prevailing, there remains the question as to changed features. It is a normal product and sterile—sterilization or rendering free from bacteria has not wrought any change in the general characteristics, as observed in the fresh product. This treated product has, when kept on ice, retained sweetness, in summer season for fourteen and one-half days. There are changes produced in the product, for carefully conducted culture tests, show, when treated, no growth, while there was considerable bacteria content before treatment. "Sterilized" and "pasteurized" milk have digestibility thereof made more difficult than when raw or natural, while comparative and confirmative tests using artificial gastric juice with and without rennet bring out the fact that the product herein not only does not have its digestibility made more difficult than the normal or raw milk, but in reality is more easily digestible.

This product of molecularly agitated milk is apparently without any marked deviation from many normal chemical conditions of the milk. Considerable microscopic research develops the fact of dissemination or apparent breaking up and more uniform scattering of the cell groupings or globules in the milk solids, not only of the proteids, but also of the fat. These discoveries are confirmed by noting conditions in the milk after standing. When the cream rises, which seems to occur more readily than in normal raw milk, the volume of cream as shown by the cream line indicates an increase varying from as much as 25% to as high as 40% above that of the raw milk from which the sample is taken. This should establish breaking up of the fat globules, or a more general diffusion or scattering thereof, thus leaving more susceptible to attack by digestive agents. A to-some-extent similar condition as to breaking up or dissemination seems to occur in the proteids. The after confirmation of this fact is found in the uniformity in texture of the portion of the original treated milk below the cream, for there is not a separation of the curd and whey even when first souring stage is reached. It is accordingly seen applicant has a bacteria-free product; that such product not only has no detrimental features as to digestibility over normal milk, but is improved; and that there has been a dissemination of the solids of the normal milk. The bringing about of this condition, or the production of this milk, is made possible by the fluid treatment, apparatus adapted for the performance of which in handling milk is shown in the drawings to add to clearness of steps of operation.

Figure 1 is a general view of the apparatus, partially in outline and partially in vertical section, with parts broken away, showing an embodiment for carrying on the steps of the process of invention hereof; and Fig. 2 is a section on the line II—II, Fig. 1.

The fluid, herein considered as milk, may be received through the supply pipe 1 and forced by circulation pump 2 through line 3, having valve 4 therein. By controlling the speed of the pump 2, the rate of delivery of milk into the regulator 5 may be varied. In connection with this force feed system by the pump, which permits of increased rate of working, there may be a gravity feed system, the milk supply being delivered by line 1 to the elevated tank 6, from which leads the line 7 having a valve 8 therein. This line 7 through line 3 enters the regulator 5. With the gravity system working, valve 8 may be adjusted to regulate rate of flow, while valve 4 cuts out the pump 2. With the force system working, valve 8 may be closed to cut out the overhead tank 6. The regulator 5 has supply lines 9 for fluid to bring the temperature of the entering milk to a predetermined point. The fluid entering the regulator 5 at lines 9 is discharged therefrom by line 10. The milk brought to a uniform temperature in the regulator 5, passes through line 11, having thermometer 12 therein, to permit checking up of the operation of the regulator and adjusting as the circumstances warrant. From line 11, the milk passes through insulating fitting 13 in the housing 14, to the semicircular, or rather hemispherical electrode 15, spaced by gasket 16 from circular insulator block 17, provided with central opening 18 which serves to materially reduce cross-sectional area of the milk stream, and accordingly increase the flow rate or velocity. The milk passing through opening 18 from electrode 15, enters the next of the series of electrodes 19 which are of an hour-glass form, having at the restricted portion a communicating passage 20. The two sections or reservoir portions of the electrode 19 are hemispherical and similar to electrode 15. After passing through the series of electrodes 19 and insulators 17, the milk reaches the terminal electrode 21, which by means of the threaded bar 22 and nut 23, is not only itself held in position, but serves at this one locking point to firmly bind together, or release the whole series of electrodes and insulators of the treating apparatus in the housing 14. The milk from electrode 21 leaves the housing through insulating fitting 13 connected up with the pipe 24, which has a thermometer 25 therein, permitting a checking of milk temperature as read on the thermometer 12 when entering the treating apparatus proper. The line 24 enters the cooler 26, from which the milk is conducted by line 27 to the bottling machine, if to be bottled, or to such vessels as are to be used for storage. Each of the electrodes 15, 19, 21, is provided with an electric terminal 28, alternate ones of which terminals are connected by lines 29, and switches 30 with main 31 to one side of the transformer 32. The remaining electrodes are connected by lines 33 with the electric main 34 to the opposite terminal of the adjustable transformer 32. The transformer 32 is in communication with a source of electric power, as the alternating current generator 35. For the purpose of controlling the steps of the process, in addition to the checking up of operation by the thermometers 12 and 25, there are provided in the electric circuit the ammeter 36, voltmeter 37 and wattmeter 38.

The resistance of milk varies with its temperature, so by bringing the milk in the regulator 5 to a certain temperature before starting the treating, and causing a uniform rate of flow so that the thermometer 25 shall show milk leaving the treatment is of constant temperature, then there will be no variation in the resistance in the milk portions of the electric circuits between opposing bowl-shaped electrodes and the perforate intervening insulator. This means that the demand for electricity during the treatment will not vary, and in consequence the volts and amperes, as well as watts may be uniform for a given rate of flow of milk with a certain temperature for the milk on entering. This electric current is of a wave action so readily controlled and of such range of vibration as to effect the dissemination, purification and improvement in the milk as outlined.

While "sterilizing" milk contemplates heating to 212° F., and "pasteurizing" is defined as heating to at least 150° F. for a period of twenty minutes, or 160° F. for ten minutes, the heating herein is kept below the minima of time and temperature thus recited, and is effectual. The heating of milk to 150° F. or above brings about undesirable changes in the physical characteristics of the milk, which are avoided herein, as the treatment may be successfully pursued with the milk leaving the apparatus at 146° F. and lower. In the treating, the flow may be governed absolutely, and due to the particular structure of the machine, the flow is positive and at any given point therein of always uniform cross-section regardless of flow rate. Furthermore, the completely inclosed features thereof, also make operation possible independent of the placing of the treater proper as to whether the milk is caused to flow up, down or more or less in a horizontal direction. As to the uniform temperature for entering the treater, it may be varied to suit conditions, but a convenient temperature for use is 120° F. The rate of flow through the treater, while adjustable or controllable as are all the other features hereof, in regular operation may be such as to expose the milk to treatment of less than one minute duration and still produce the sterile product as outlined. For instance, in practice some milk can be satisfactorily treated while flowing at the rate of six hundred quarts per hour through the machine and subjected to 2200 volt, 6 ampere current of electricity. Due to condition of the milk, it may offer a resistance below the average, and for ready adjustment to take care of such emergencies, flow rate may be increased or one or more switches 30 thrown out to apply such uniform wattage or amperage as is desired to effect the result. The complete inclosing of substance treated during the performance of the steps, not only adds to the safety in operation, but also insures against contamination or departure from certain normal conditions.

The disposal of the bowl-shaped electrodes with contact surface of large area uniformly distant from maximum flow and current passages 18, permits a radiating diffusion of current to avoid effective intensity except in the congested passages 18. The pre-heating economizes electricity, but the additional incidental heating in treating by the current is not a cooking.

What is claimed and it is desired to secure by Letters Patent is:

A sterilized milk of improved digestibility having approximately normal viscosity, normal specific gravity, normal acidity, normal content of water and ash, decreased casein content, and increased globulin and albumin content over normal milk.

In testimony whereof I hereunto set my hand in the presence of two witnesses.

JAMES L. GOUCHER.

Witnesses:
FRANK W. GOUCHER,
CHARLES H. KITCHEN.